United States Patent
Vicente et al.

(10) Patent No.: US 10,560,462 B2
(45) Date of Patent: Feb. 11, 2020

(54) CONTEXT-BASED RESOURCE ACCESS MEDIATION

(71) Applicant: Intel Corporation, Santa Clara, CA (US)

(72) Inventors: John B. Vicente, Roseville, CA (US); Christiaan M. Mets, Chandler, AZ (US); Justin Lipman, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 15/500,055

(22) PCT Filed: Sep. 26, 2014

(86) PCT No.: PCT/CN2014/087495
§ 371 (c)(1),
(2) Date: Jan. 28, 2017

(87) PCT Pub. No.: WO2016/045073
PCT Pub. Date: Mar. 31, 2016

(65) Prior Publication Data
US 2017/0279813 A1    Sep. 28, 2017

(51) Int. Cl.
*G06F 21/00*    (2013.01)
*H04L 29/06*    (2006.01)
*H04W 12/10*    (2009.01)

(52) U.S. Cl.
CPC ......... *H04L 63/107* (2013.01); *H04L 63/101* (2013.01); *H04L 63/102* (2013.01); *H04W 12/10* (2013.01)

(58) Field of Classification Search
None
See application file for complete search history.

(56) References Cited

U.S. PATENT DOCUMENTS 7,065,702 B2 *   6/2006   Oren ................... G11B 20/18
                                              714/807
8,744,352 B2 *   6/2014   Pochop, Jr. ........... H04W 16/18
                                              455/41.1
(Continued)

FOREIGN PATENT DOCUMENTS

CN    1467642 A    1/2004
CN    1573725 A    2/2005
(Continued)

OTHER PUBLICATIONS

International Search Report and Written Opinion dated Jul. 2, 2015 from International Application No. PCT/CN2014/087490, 11 pages.
(Continued)

*Primary Examiner* — Maung T Lwin
(74) *Attorney, Agent, or Firm* — Schwabe, Williamson & Wyatt, P.C.

(57) ABSTRACT

Apparatuses, methods, and computer-readable media for a context-based access mediator ("CAM") are described. The CAM may be configured to mediate access to computer-accessible resources by a user using a computing device after receiving a request from the computing device for the computing device to access a computer-accessible resource. The computer-accessible resource may be local or remote to the computing device. The CAM may be configured to receive the request and to mediate access to the requested resource. Such mediation may be performed through the CAM determining whether the resource may be accessed by the computing device and/or through the CAM determining which resources are available to the be accessed by the computing device. The CAM may be configured to mediate access to computer-accessible resources based on information about a context for the computing device and/or com- (Continued)

puter-accessible resource. Other embodiments are described and claimed.

25 Claims, 7 Drawing Sheets

(56) References Cited

U.S. PATENT DOCUMENTS

| | | | | |
|---|---|---|---|---|
| 8,782,741 | B1* | 7/2014 | L'Heureux | H04W 12/06 726/3 |
| 2004/0015729 | A1* | 1/2004 | Elms | G06F 21/83 726/34 |
| 2004/0068668 | A1* | 4/2004 | Lor | H04L 63/107 726/15 |
| 2006/0161970 | A1 | 7/2006 | Hopen et al. | |
| 2006/0264218 | A1 | 11/2006 | Zhang et al. | |
| 2009/0205018 | A1* | 8/2009 | Ferraiolo | G06F 21/6218 726/1 |
| 2011/0167479 | A1 | 7/2011 | Maes | |
| 2012/0102549 | A1* | 4/2012 | Mazzaferri | G06F 21/6218 726/4 |
| 2012/0303827 | A1 | 11/2012 | Neystadt et al. | |
| 2013/0091551 | A1* | 4/2013 | Rajakarunanayake | H04W 4/21 726/4 |
| 2013/0196590 | A1* | 8/2013 | Fyke | H04W 8/24 455/3.01 |
| 2014/0181904 | A1 | 6/2014 | Craig et al. | |
| 2014/0282964 | A1 | 9/2014 | Stubblefield | |
| 2015/0135270 | A1* | 5/2015 | Robison | G06F 21/30 726/4 |
| 2016/0019401 | A1* | 1/2016 | Kumar | G06F 21/6272 726/30 |

FOREIGN PATENT DOCUMENTS

| | | |
|---|---|---|
| CN | 102984199 A | 3/2013 |
| CN | 103109510 A | 5/2013 |
| CN | 103166783 A | 6/2013 |

OTHER PUBLICATIONS

Extended European Search Report dated May 2, 2018 for European Patent Application No. 14902644.5, 8 pages.
Office Action dated May 29, 2019 for Chinese Patent Application No. 201480081409.9, 26 pages.

* cited by examiner

CONTEXT-BASED RESOURCE ACCESS MEDIATION

CROSS REFERENCE TO RELATED APPLICATIONS

The present application is a national phase entry under 35 U.S.C. § 371 of International Application No. PCT/CN2014/087495, filed Sep. 26, 2014, entitled "CONTEXT-BASED RESOURCE ACCESS MEDIATION", which designated, among the various States, the United States of America and is hereby incorporated by reference.

TECHNICAL FIELD

The present disclosure relates to the field of data processing, in particular, to apparatuses, methods and storage media associated with mediation of access to computer-accessible resources.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computing devices are frequently used in different environments, and under multiple contexts while needing access to computer-accessible resources. However, determining access in various contexts may prove complicated for some users, and in particular as users utilize personal devices in work-related contexts and vice versa. In some scenarios, users may desire access to particular resources, such as networked resources and files, to be made available to them when in particular contexts to facilitate their work or leisure activities. For example, a user may wish for their laptop to have automated access to a home media collection when arriving at home, or for access to confidential data stores when arriving at work. In other scenarios, it may be desirable for users to be prevented from accessing particular resources depending on context. For example, if a user is in a particularly sensitive work or governmental location, it may be undesirable for the user to have access to particular mobile resources, such as a camera, that may be used to copy or distribute sensitive information. Existing techniques may not facilitate the use of such resources in an efficient manner.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a context-based access mediator ("CAM") may be configured to mediate access to computer-accessible resources by a user using a computing device. In various embodiments, the CAM may be configured to receive a request from a computing device, such as, a mobile device or laptop, for the computing device to access a computer-accessible resource. In various embodiments, the computer-accessible resource may be local to the computing device, such as a microphone, camera, or removable media slot. In various embodiments, the computer-accessible resource may be remote from the computing device, such as a separate computing device, a networked resource, or a file. In various embodiments, the computer-accessible resource may include one or more services, such as services that perform activities or provide information or content in response to requests or instructions. For example, the computing-accessible resource may include a location service, a printing service, an image service that provides images in response to an image request, etc. In various embodiments, the computing device may send the request in response to a request from a user of the computing device to access a computer-accessible resource. In other embodiments, the computing device may automatically send the request. In various embodiments, the computing device may automatically send the request, for example, in response to occurrence of an event with the computing device or a change in context of the computing device or the user, or in response to an advertisement of one or more computer-accessible resources that is received by the computing device.

In various embodiments, the CAM may be configured to receive the request and to mediate access to the requested resource. In some embodiments, such mediation may be performed through the CAM determining whether the resource may be accessed by the computing device. In other embodiments, the mediation may be performed through the CAM determining which resources are available to the be accessed by the computing device, and offering indications of those resources to the computing device. In various embodiments, the CAM may be configured to mediate access to computer-accessible resources based on information about a context for the computing device and/or computer-accessible resource. Such context may include, but is not limited to, information regarding a current operational state of the computing device, a location of the device (which may include a particular location, a location within a defined area, and/or a location within a range of a known particular location), a proximity of the device to the computer-accessible resource, etc. In various embodiments, the CAM may be configured to consider this context as well as an operating profile for the user and the computing device to determine whether access may be provided to a requested computer-accessible resource and/or which resources may be accessed and how. Particular examples of these and other embodiments are described herein.

Figure 1:
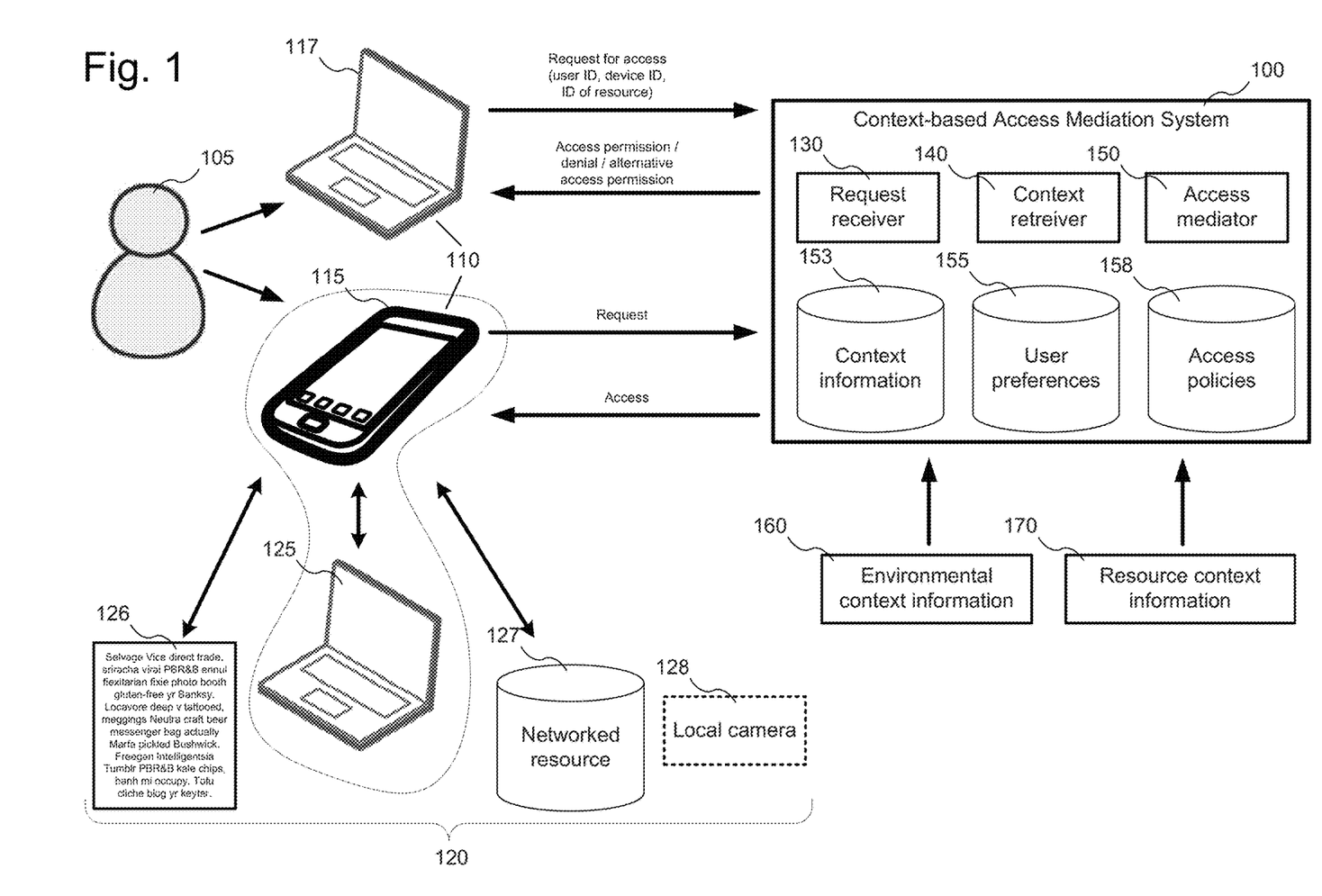
FIG. 1 illustrates an example arrangement for context-based access mediation, in accordance with various embodiments.

Referring now to FIG. 1, an example arrangement for context-based information presentation is shown in accordance with various embodiments. As illustrated in FIG. 1, a context-based access mediation system 100 ("CAM 100") may be configured to communicate with one or more computing devices 110 operated (or otherwise associated with) a user 105. While in the example of FIG. 1 the CAM 100 is illustrated as a single entity, in various embodiments, the modules illustrated as part of the CAM 100 may be distributed across multiple computing devices, which may be local or remote from the computing devices 110. In some embodiments, one or more parts or activities of the CAM 100 may be implemented on a cloud-based computing resource. In some embodiments, as well, one or more parts or activities of the CAM 100 may be implemented on one or more computing devices 110. Thus, in some embodiments, the computing devices 110 may perform one or more activities described herein for mediating access by the computing devices 110 to computer-accessible resources.

In various embodiments, the CAM 100 may be configured to communicate with a variety of computing devices 110, including mobile device 115 or laptop computer 117, as well as other computing devices, such as desktop computers, tablets, wearable devices (including smart watches or head- or eyewear-based devices), etc. In various embodiments, the computing device 110 may be configured to send a request to the CAM 100 to request access to one or more computer-accessible resources 120. In various embodiments, as described herein, the computing device 110 may be configured to send these requests in response to the user 105 requesting (or attempting) access to a computer-accessible resource 120. In other embodiments, the computing device 110 may be configured to automatically send a request to the CAM 100 rather than waiting for an explicit request for a resource by the user 105. Through such an automatic request, a configured computing device may provide mediation of computer-accessible resources for the user 105 in various changing contexts without requiring that the user 105 be aware of a change of context. In such scenarios, computer-accessible resources 120 may be made available to the user 105 prior to the user 105 realizing that they are in need of access to the computer-accessible resources 120. In some embodiments, the computing device 110 may be configured to send the request automatically in response to an advertisement that one or more computing-accessible resources are available for access.

In some embodiments, the computer-accessible resources 120 may be local to the computing device 110 itself. For example, a user of a smartphone 115 may desire to use a built-in camera 128 (illustrated as a dotted box) in a potentially sensitive location (such as a geofenced area or within a particular range of a sensitive location), and the CAM 100 may be configured to determine whether the use of the camera should be allowed in that location. In other embodiments, the CAM 100 may be configured to mediate access to other local resources of computing devices 120, such as, but not limited to, microphones, video cameras, removable media slots, cellular modems, etc. In various embodiments, such local computer-accessible resources 120 may be physically located in or on the computing device 110. In other embodiments, the local computer-accessible resources may not be in direct physical contact with the computing device 110 but may instead be in communication with the computing device 110, such as by being tethered or paired to the computing device 110 (such as, for example, a wireless headset or wireless headphones). In various embodiments, the access requested may vary based on the type of computer-accessible resource, and may include, but is not limited to write access, read access, operational access, and/or ability to determine a status of the computer-accessible resource.

In other embodiments, the computer-accessible resources 120 for which access is requested may be remote from the computing device 110. In various embodiments, such requested access may include access via various communication techniques, including wired communication (e.g., Ethernet), wireless device-to-device communications (e.g., Bluetooth™, Low-Energy Bluetooth™, etc.), local wireless networks, and/or the Internet). In some embodiments, the computing device 120 may be another device, such as the laptop computer 125. In other embodiments, the remote computing device 120 may include a file 126, which may include files of various types, including word processing files, image files, databases, spreadsheets, web pages, etc. In other embodiments, the remote computing device 120 may include a networked resource 127, such as a server, networked database, or a web server (such as to access a web site). In various embodiments, the computing device 110 may request connection to a computer-accessible resource that is physically proximate to the computing device 110, such as the laptop computer 125 which is illustrated as being physically close to the mobile device 115. The proximity (e.g., the detected presence of the computer-accessible resource by the computing device 110 without physical contact) or the distance between the computing device 110 and the computer-accessible resource to be considered "proximate," may be based on the particular implementation of the computing device 110 and/or the mechanism used to detect proximity (e.g., proximity sensor, network-based location services, triangulation, signal strength measurement, etc.) In various embodiments, such a connection to a proximate device may facilitate connections between computing devices 110 and computer-accessible resources 120 that are useful when the user 105 is nearby to both, such as, but not limited to: file sharing, media sharing, handoff of phone calls or messaging between devices, etc. In other embodiments, the computing device 110 may not be physically proximate to the computer-accessible resource 120, and may communicate using protocols and technologies such as those discussed above.

In various embodiments, the CAM 100 may include one or more modules, which may be implemented in hardware and/or software, to perform techniques described herein. For example, as mentioned above, in various embodiments, the CAM 100 may be configured to receive requests from computing devices 110; these requests may be received, in various embodiments, at a request receiver 130 ("RR 130"). The RR 130 may be configured to receive information relating to the requested access in the request, such as identification of the user 105, the computing device 110, and/or the computer-accessible resource 120. In various embodiments, different techniques may be utilized to identify these entities, as may be recognized, including login information, MAC addresses, UUIDs, IP addresses, path names, etc. In various embodiments, the RR 130 may be configured to identify these entities from a received request and to provide the information to other modules of the CAM 100, such as a context retriever 140 "CR 140" and/or an "access mediator 150" ("AM 150"). The RR 130 may also be configured to determine one or more operating profiles for the user 105, computing device 110, or computer-accessible resource 120 associated with the request.

In various embodiments, the CR 140 may be configured to obtain information for a current context of usage of the computing device 110. In various embodiments, the context of the computing device 110 may include an operational state (or "operating state") of the computing device 110, which refers to information about a state of the computing device 110 itself or local resources of the computing device 110. The local resources of the computing device 110 may include individual components/subsystems of the computing device 110, applications executing or otherwise resident on the computing device 110, communication sessions between the computing device 110 and one or more computer-accessible resources, and the like. For example, such an operational state may include login status or session status of one or more users 105 using the computing device 110 on one or more computer-accessible resources 120, such as servers or web sites. In another example, the operational state of the computing device 110 may include a state of one or more applications executing or otherwise resident on the computing device 110, and/or networking resources of the computing device 110. In another example, the operational state of the computing device 110 may include activity of one or more components of the computing device 110, such as communication circuitry (e.g., transmission/reception power), cameras, microphones, processor(s) (e.g., processor utilization, processor load), storage/memory (e.g., utilization of memory/storage devices), battery state (e.g., current charge, current load, etc.), thermal data of such components, etc. In other embodiments, the context may include a physical location of the computing device 110, which may be measured at different levels of granularity and detail (e.g., a building, a block a city, a state, a nation, etc.), and may be defined in various ways, including geographical coordinates, range from a particular location, and/or a geofence. In various embodiments, the context may include a physical proximity distance to one or more computer-accessible resources, such as other computing devices, beacons for determining location, etc. In yet other embodiments, the context may include information about usage of the computing device such as time of usage, users that are logged into or otherwise operating the computing device, web sites or other network resources that have been visited, degree of user activity on the device, etc. In various embodiments, other information may be utilized to determine a context for the computing device, as may be recognized.

In various embodiments, the CR 140 may also be configured to receive context information from other sources. For example, the CR 140 may be configured to receive environmental context information 160, such as information from network resources, cameras, proximity sensors, beacons, and/or other sensors or devices, which may have information about environmental contexts. For example, the CR 140 may obtain information regarding the location of one or more computing devices in a facility, or a list of users which is currently logged into a network resource, or a list of people who have used a security card to check into a facility, or whether or not persons are physically present in a secure room. In various embodiments, other environmental context information may be obtained by the CR 140, as may be recognized. In various embodiments, the CR 140 may be configured to obtain resource context information 170 as well. For example, the CR 140 may be configured to receive information from a laptop computer 125 of those mobile devices which are physically proximate to the laptop computer 125. In other embodiments, the CR 140 may be configured to receive information about where a particular computer-accessible resource 120 is located. In other embodiments, the CR 140 may be configured to receive information about users that are currently logged-in to (or accessing) a networked computer-accessible resource. In various embodiments, other resource context information may be obtained by the CR 140, as may be recognized. In various embodiments, the CR 140 may store retrieved context information in a context information store 153 ("CI 153") for later access. In some embodiments, the CI 153 may include information that is not stored directly by the CR 140 but is instead placed in the CI 153 for retrieval by the CR 140. Additionally, while the CI 153 is illustrated as being part of the CAM 100, in various embodiments, the CI 153 may be located externally to the CAM 100, and/or may be maintained completely separately from the CAM 100 itself.

The AM 150 may be configured to mediate access between a computing device 110 and one or more computer-accessible resources 120. In various embodiments, the AM 150 may be configured to perform this mediation based on context information retrieved by the CR 140 and/or stored at the CI 153. In various embodiments the AM 150 may also be configured to mediate access based on one or more operating profiles for the computing device 110 and/or user 150. In various embodiments, the operating profiles may include information about which users are allowed access to which computer-accessible resources 120, and under which contexts such access is allowed. In various embodiments, the operating profiles may also include information about what types of access are allowed between particular computing devices 110 and particular computer-accessible resources 120. In various embodiments, the operating profiles may also include information about alternative access types or alternative computer-accessible resources 120 that may be offered when a requested access may not be allowed. In various embodiments, the operating profiles may be determined by the RR 130 based on stores of user preferences 155 and/or access policies 158, these profiles may then be used by the AM 150. These user preferences and/or access policies may be predetermined and stored at the stores of user preferences 155 and/or access policies 158 by the user 105 and/or other users. As discussed above while the stores of user preferences 155 and/or access policies 158 are illustrated as being part of the CAM 100, in various embodiments, they may be located externally to the CAM 100, and/or may be maintained completely separately from the CAM 100 itself.

Figure 2:
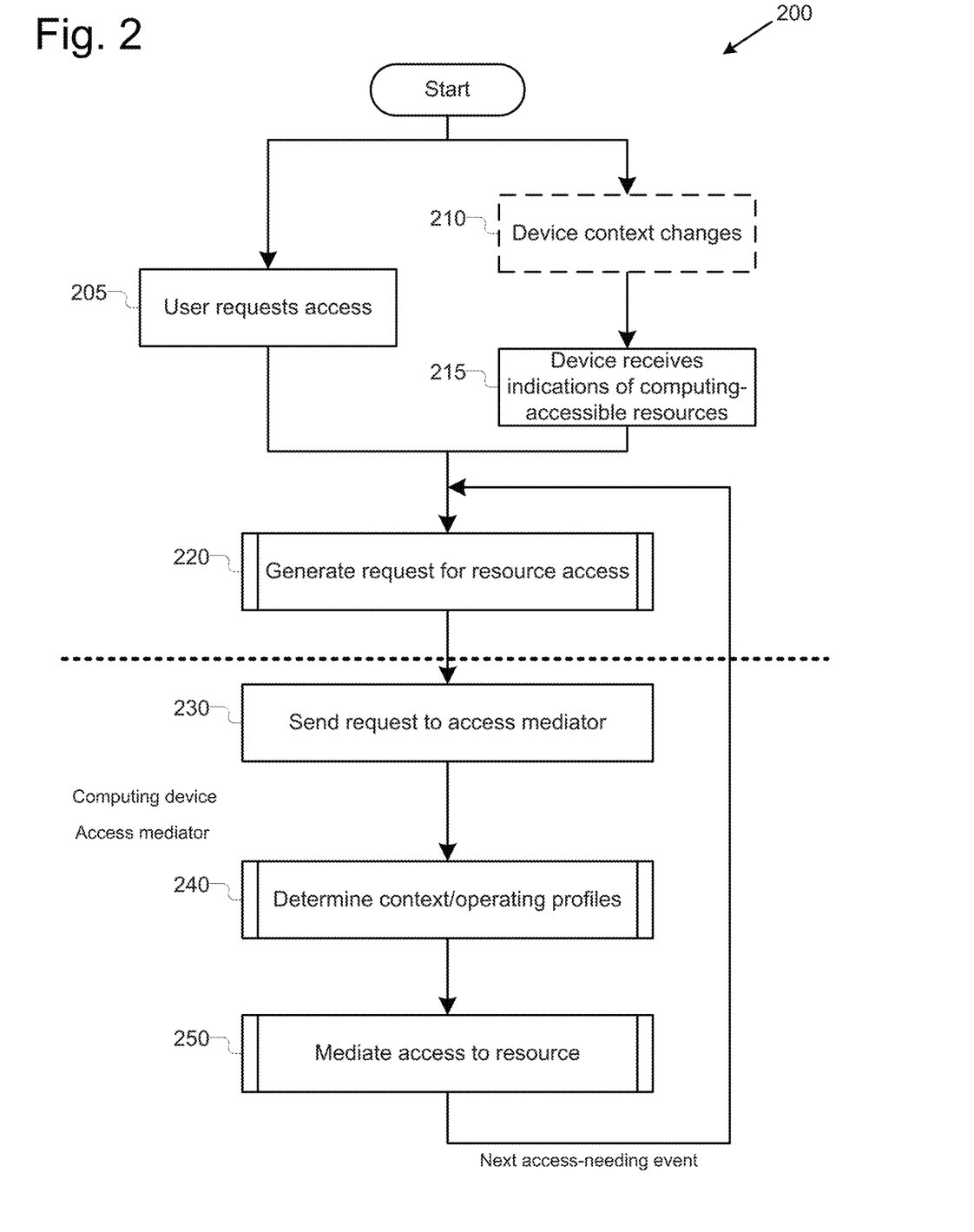
FIG. 2 illustrates an example process for context-based resource access mediation, in accordance with various embodiments.

Referring now to FIG. 2, an example process 200 for context-based resource access mediation is illustrated in accordance with various embodiments. While FIG. 2 illustrates particular operations in a particular order, in various embodiments the operations may be combined, split into parts, and/or omitted. As illustrated, operations 205, 210, 215, 220, and 230 of process 200 are performed by a computing device 110 that is configured to interoperate with the CAM 100, while operations 240 and 250 are performed by the CAM 100. In other embodiments, operations may be performed by different entities than those illustrated.

In various embodiments, the process may begin at either operation 205, 210, or 215. At operation 205, the user 105 may request access to a particular computer-accessible resource 120 by a computing device 110. In various embodiments, the request may be an explicit request for access, such as the user 105 attempting to connect to a networked share or obtain a networked file. In other embodiments, at operation 205 the user may attempt to utilize a local resource, such as a camera 128 on a mobile device 115.

Alternatively, in various embodiments, process 200 may begin at optional operation 210, when the computing device 110 changes contexts. In various embodiments, these content changes may include user context changes, device context changes, and/or changes in environment context. For example, the user 105 may change the computing device 110's context by physically bring the computing device 110 into a new physical location, such as particular geographical coordinates, a geofenced location, and/or a particular range from a known location. In another example, the user 105 may change the context of the computing device 110 by connecting to a network, changing the connectivity of the computing device 110. In such embodiments, the computing device may be configured to automatically send a request to the CAM 100 rather than waiting for an explicit request for a resource by the user 105. Next, at operation 215, the computing device may receive indications of one-or-more computer-accessible resources. This may happen, in various embodiments, in response to a request from the computing device 110 for available computer-accessible resources. In other embodiments, a computer-accessible resources 120 may advertise itself as being available for access (or available under particular scenarios); such advertisement may utilize known techniques. In other embodiments, the computing device 110 may request information about available computer-accessible resources before having received indications of any such resources (not illustrated) in order to receive the indications. This request may also be performed according to known techniques.

In either event, at operation 220, the computing device 110 may generate a request for access to the computer-accessible resource 120. Particular details of operation 220 are described below with reference to process 300 of FIG. 3. Next, at operation 230, the computing device may send the generated request to the CAM 100. Next, at operation 240, the CAM 100 may determine context and operating profiles based on the request. Particular details of operation 240 are described below with reference to process 400 of FIG. 4. At operation 350, the CAM 100 may mediate access to the requested computer-accessible resource 120. Particular details of operation 250 are described below with reference to process 500 of FIG. 5.

Figure 3:
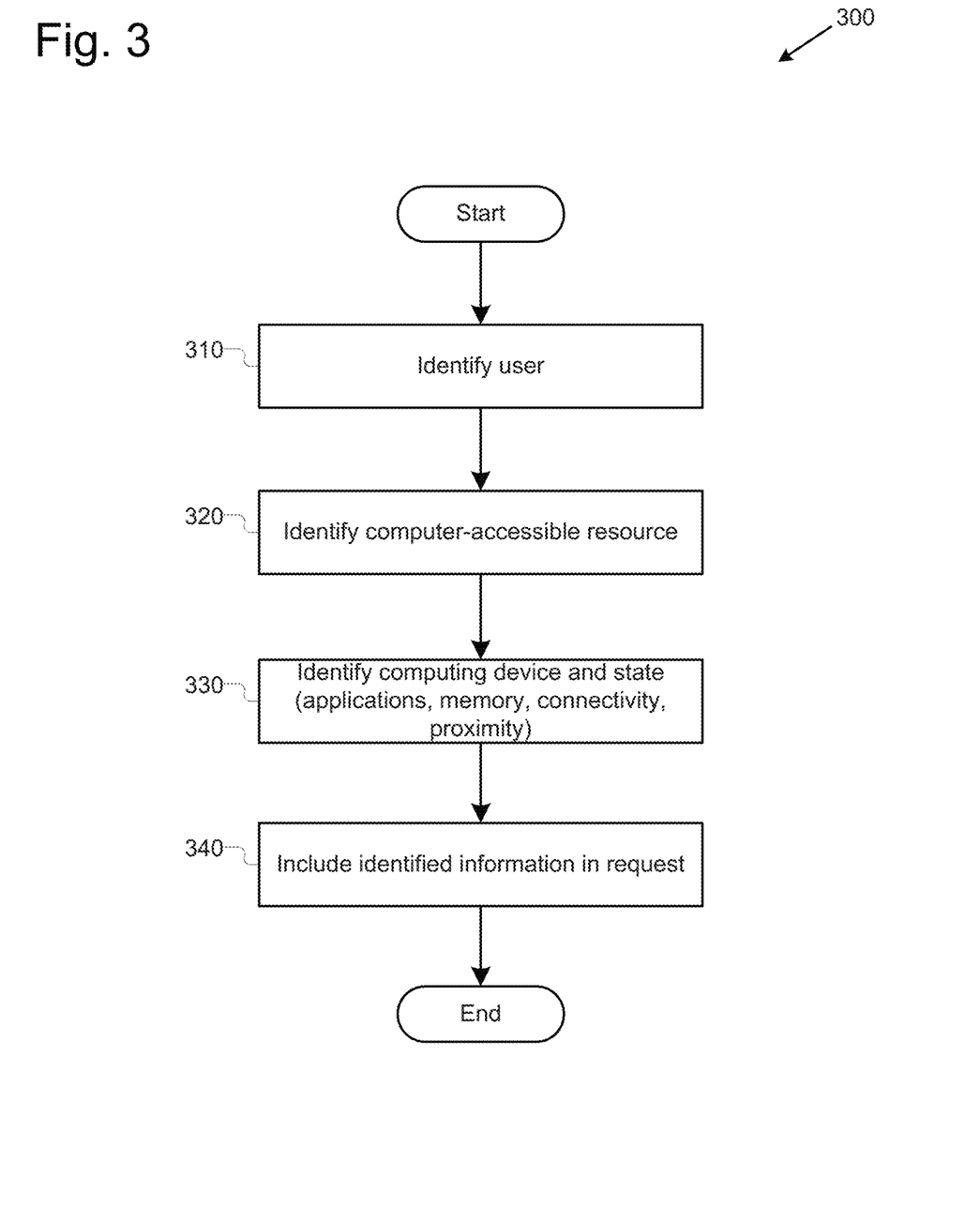
FIG. 3 illustrates an example process for generating a request to access a computer-accessible resource, in accordance with various embodiments.

FIG. 3 illustrates an example process 300 for generating a request to access a computer-accessible resource, in accordance with various embodiments. While FIG. 3 illustrates particular operations in a particular order, in various embodiments the operations may be combined, split into parts, and/or omitted. Process 300 may include one or more implementations of operation 220 of process 200 of FIG. 2. In various embodiments, process 300 may be performed by one or more computing devices 110. The process may begin at operation 310, where the computing device 110 may identify the user 105. As discussed above, in various embodiments the user 105 may be identified through various techniques. Information which may be used to identify users 105 may include, but is not limited to: log in information, name, photo, biometric information, voice information, etc. Next, at operation 320, the computing device 110 may identify the computer-accessible resource 120 for which access is being requested. As discussed above, in various embodiments the computer-accessible resource 120 may be identified through various techniques, which may vary based on the type or location of the computer-accessible resource 120. Information which may be used to identify computer-accessible resources 120 may include, but is not limited to: UUIDs, IP addresses, MAC addresses, computer names, filenames, paths, etc.

Next, at operation 330, the computing device 110 may identify itself as well as a current state of the computing device 110. As discussed above, in various embodiments the computing device 110 may be identified through various techniques. Information which may be used to identify computing device 110 may include, but is not limited to: UUIDs, IP addresses, MAC addresses, computer names, etc. In various embodiments the computing device 110 may utilize various techniques to identify the current state of the computing device 110. Information which may be used to identify current state of the computing device 110 may include, but is not limited to information identifying: executing applications, resident applications current users, logins of current users, memory usage or state, network connections, the computing device 110's knowledge of its absolute or relative location (such as through the use of GPS or beacon proximity), the computing device 110's of any proximate computing devices or resources, etc.

Next, at operation 340, the computing device 110 may include the information identified at operations 310, 320, and 330 in a request to be sent to the CAM 100. It may be noted that, in various embodiments, the computing device may not include every type of information discussed above, and may even exclude one or more of user-identifying information, computer-accessible resource information and/or computing device information. After operation 340, the process may end.

Figure 4:
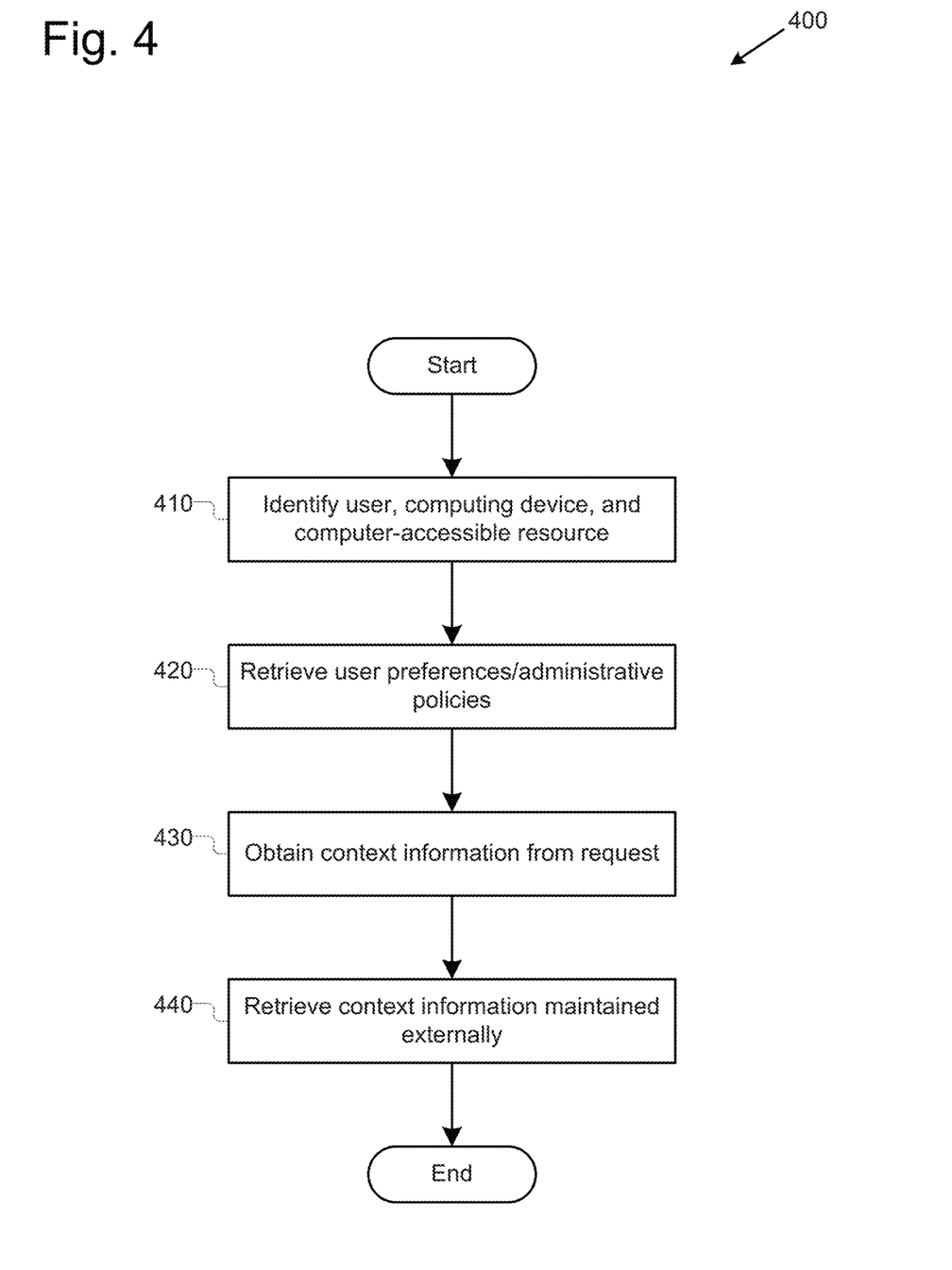
FIG. 4 illustrates an example process for determining context and operating profiles relating to a request for access, in accordance with various embodiments.

FIG. 4 illustrates an example process 400 for determining context and operating profiles relating to a request for access, in accordance with various embodiments. While FIG. 4 illustrates particular operations in a particular order, in various embodiments the operations may be combined, split into parts, and/or omitted. Process 400 may include one or more implementations of operation 240 of process 200 of FIG. 2. In various embodiments, process 400 may be performed by the CAM 100, and in particular by the RR 130 and the CR 140. The process may begin at operation 410, where the CAM 100 may identify the user 105, computing device 110, and the computer-accessible resource 120 relating to the request. In various embodiments, the CAM 100 may identify these entities from information included in the request sent from the computing device 110. Next, at operation 420, the CAM 100 may retrieve user preferences and administrative policies that are associated with the identified user 105, computing device 110, and/or computer-accessible resource 120. In various embodiments, these may be obtained from the stores of user preferences 155 and access policies 158. In various embodiments, the combination of the user preferences and policies may constitute an operating profile, through which access determinations may be made.

Next, at operation 430, the CAM 100 may obtain context information from the request. As discussed above, such context information may include, but is not limited to, information such as information identifying: executing applications, resident applications current users, logins of current users, memory usage or state, network connections, the computing device 110's knowledge of its absolute or relative location (such as through the use of GPS or beacon proximity), the computing device 110's of any proximate computing devices or resources, etc. Next, at operation 440, the CAM 100 may retrieve context information from external resources, such as environmental context information 160 and resource context information 170. In some embodiments, device context information may also be persistently stored in external resources as well. In various embodiments, the CAM 100 may retrieve this context information from the CI 153. After operation 440, the process may end.

Figure 5:
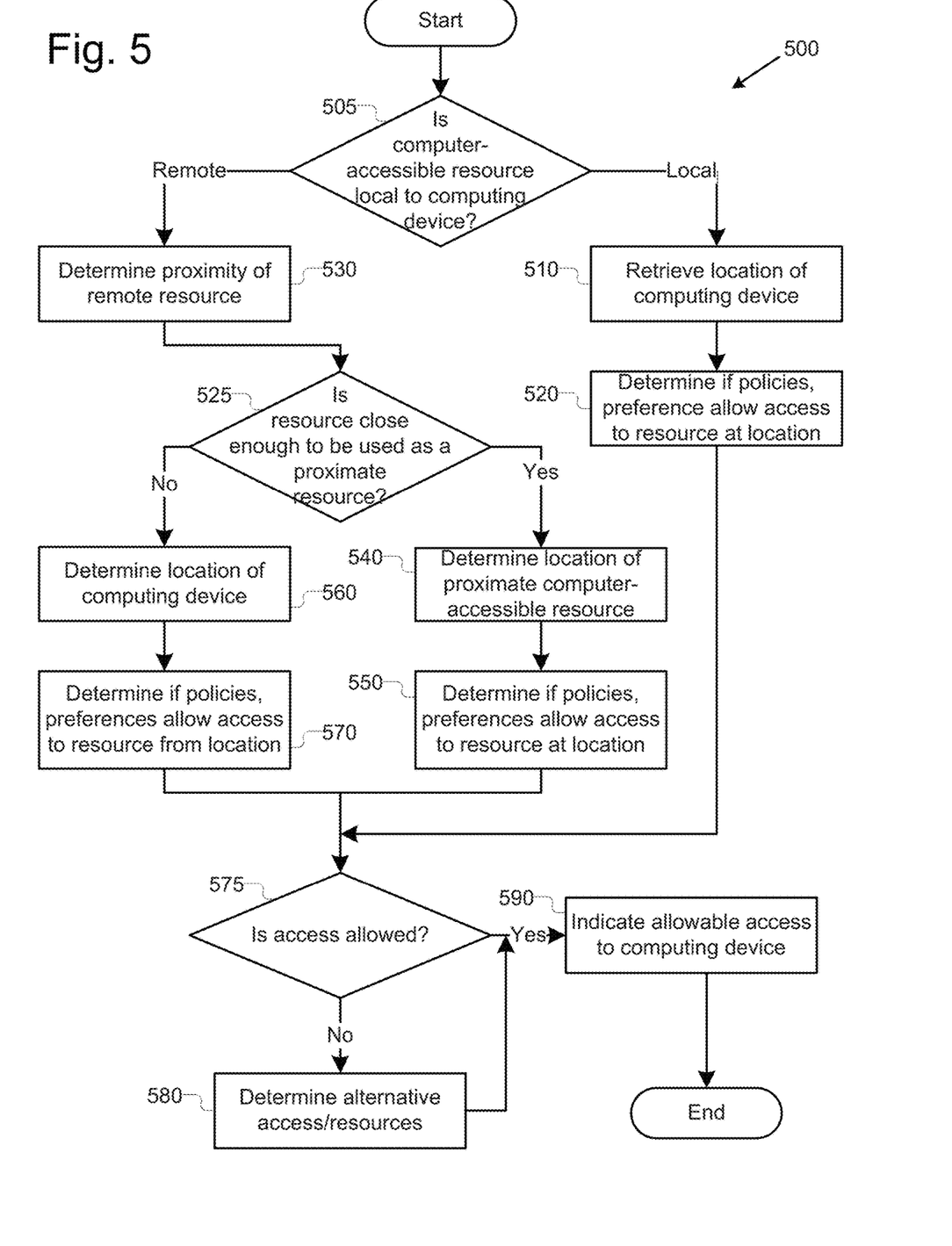
FIG. 5 illustrates an example process for mediating access to a computer-accessible resource, in accordance with various embodiments.

FIG. 5 illustrates an example process 500 for mediating access to a computer-accessible resource, in accordance with various embodiments. While FIG. 5 illustrates particular operations in a particular order, in various embodiments the operations may be combined, split into parts, and/or omitted. Process 500 may include one or more implementations of operation 250 of process 200 of FIG. 2. In various embodiments, process 500 may be performed by the CAM 100, and in particular by the AM 150. It may be noted that particular example mediation determinations are described with reference to process 500 of FIG. 5. However, in other embodiments, other determinations may be used and/or based on other information than what is illustrated in FIG. 5.

The process may begin at decision operation 510, where the AM 150 may determine whether the computer-accessible resource 120 is local to the computing device 110. If so, then at operation 510, the AM 150 may retrieve the location of the computing device 110. This location may, in various embodiments, be retrieved from different sources, such as the request sent from the computing device 110 itself and/or environmental context information 160. Next, at operation 520, the AM 150 may compare the operating profile determined for this request with the current context for the computing device 110 to determine whether access to the local computer-accessible resource 120 is allowed at that location. In various embodiments, this determination may prevent local computer-accessible resources from being utilized in locations where they are not desired to be permitted, such as facilities with sensitive information.

If, however, the computer-accessible resource 120 is determined to be remote from the computing device 110, then at operation 530, the AM 150 may determine a proximity of the computing device 110 to the computer-accessible resource 120. In various embodiments, this proximity may be retrieved from different sources, such as the request sent from the computing device 110 itself and/or resource context information 170. Next, at decision operation 525, the AM 150 may determine whether the computer-accessible resource 120 is close enough to the computing device 110 to be used as a proximate resource. In various embodiments, the AM 150 may utilize an operating profile to determine a proximity for such usage. In various embodiments, such determined proximities may differ based on the user 105, computing device 110, computer-accessible resource 120, the location of any of these, or a combination thereof.

If the computer-accessible resource 120 is close enough to be used as a proximate resource, then at operation 540, the AM 150 may determine the location of the proximate computer-accessible resource 120. In various embodiments, the determined location may include an absolute or relative location of the computer-accessible resource 120, such as described herein. Next, at operation 550, the AM 150 may compare the operating profile determined for this request with the location of the computer-accessible resource 120 to determine whether access to the local computer-accessible resource 120 is allowed at that location. In various embodiments, this determination may prevent usage of the computer-accessible resource 120 in locations where such usage may result in compromising confidential information, such as the display of information on a proximate computer-accessible resource 120 in a public location.

If, however, the computer-accessible resource 120 is not close enough to be used as a proximate resource, then at operation 560, the AM 150 may determine the location of the computing device 110. In various embodiments, the determined location may include an absolute or relative location of the computing device 110. Next, at operation 570, the AM 150 may compare the operating profile determined for this request with the location of the computer-accessible resource 120 to determine whether access to the computer-accessible resource 120 is allowed when the computing device is at that location. In various embodiments, this determination may prevent usage of the computer-accessible resource 120 by the computing device 110 in locations where such usage may result in compromising confidential information, such as the display of information on a on the computing device 110 in a public location.

The process may then proceed from operations 520, 550, or 570 to decision operation 575, where the AM 150 may determine if the requested access was allowed. If so, then at operation 590, the CAM 100 may indicate to the computing device 110 that the access is allowed and the process may then end. If not, however, then at operation 580, the AM 150 may determine which types of access, if any are allowed given the context and the profile, and/or alternative computer-accessible resources 120 which may be accessed by the computing device 110. The process may then proceed to operation 590 to indicate the allowable access to the computing device 110. The process may then end.

In various embodiments, other techniques may be utilized for mediating access to computer-accessible resources based on operating profiles and retrieved context, as may be recognized. In particular, in some embodiments, the AM 150 may be configured to determine one or more computer-accessible resources 120 that are available for access by a computing device 110 given a current context regardless the computer-accessible resource 120 to which the computing device 110 originally requested access. In some embodiments, the request sent by the computing device 110 may not identify a particular computing device 110 at all, but may instead ask for indications of resources to which the computing device 110 may be permitted to access. In such embodiments, automated connection and access to computer-accessible resources 120 may be facilitated without requiring the user 105 to request particular access or resources.

Additionally, in various embodiments, the techniques described herein may facilitate particular use cases for users 105. Examples of these use cases follow.

In a first use case, which may referred to as "device personalization" or "DP", techniques described herein may facilitate customization of a dynamic workspace orientation of a single device to a single user's operating context. In various embodiments, the context may be simplified to one of "work", "home", or "blended" (combined). Based on changing contexts, such as shifting of a user's 105 login from a social media account to a corporate account, changing location, or detecting device-to-device proximity, the computing device's workspace may be modified as appropriate to the current context. This may, in various embodiments, include changes to desktop appearance, power management, OS and network services, user OS preferences, primary applications, and document accessibility.

A second use case may be termed "multi-device workspace", or "MDW". This use case may encompass DP aspects described above, but may also extend workspace customization and interoperability across a single user's 105 multiple mobile devices through mediated service connectivity. This mediation may be based on real-time trust and proximity calculations. In this use case, the user 105 may extend their mobile workspace across personal or corporate devices, enabling content transfer, application remote control or application-to-application interactions between their respective computing devices 110$s'$ workspaces. Specific connectivity requirements may allow or extend the user's workspace interoperability between their personal or corporate devices. Through secure pairing, IT registered services discovery & advertisement and policy-based connectivity, common or mixed applications or services may persist, execute or be presented across the secured, managed and paired devices.

A third use case may be deemed "multi-user workspace", or "MUW". In various embodiments, this use case may include aspects of the DP and MDW use cases. However, MUW may extends the connectivity interactions and mediation beyond the single-user scenario of MDW. In this use case, two or more users 105 may operate within a corporate business group, home family group, or mixed groups across disparate, potentially un-trusted groups. For both MDW and MUW, these use cases may be oriented to connecting and personalizing workspaces over a local or remote network and may therefore extend the concept of a workspace to two or more devices for collaboration purposes, sharing across applications or synchronizing content or to just discover & auto-connect peripherals & networked resources.

Figure 6:
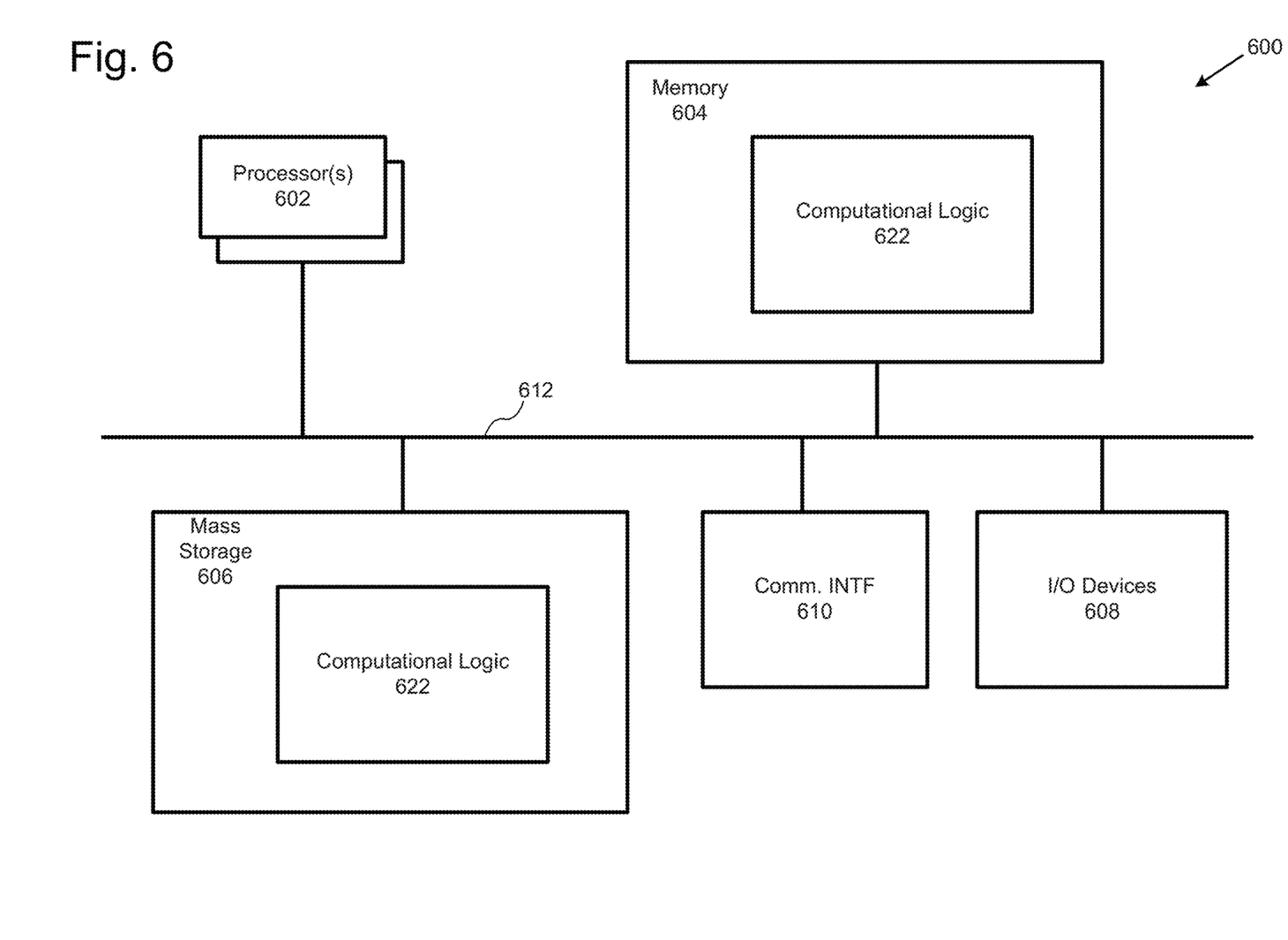
FIG. 6 illustrates an example computing environment suitable for practicing various aspects of the present disclosure, in accordance with various embodiments.

Referring now to FIG. 6, an example computer suitable for practicing various aspects of the present disclosure, including processes of FIGS. 2-5, is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth, WiFi, Near Field Communications, Radio-frequency identification, and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing one or more of the modules shown in FIG. 1, and/or the operations associated with techniques shown in FIGS. 2-5, collectively referred to as computing logic 622. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices. In embodiments, the programming instructions may be stored in one or more computer readable non-transitory storage media. In other embodiments, the programming instructions may be encoded in transitory storage media, such as signals.

The number, capability and/or capacity of these elements 610-612 may vary. Their constitutions are otherwise known, and accordingly will not be further described.

Figure 7:
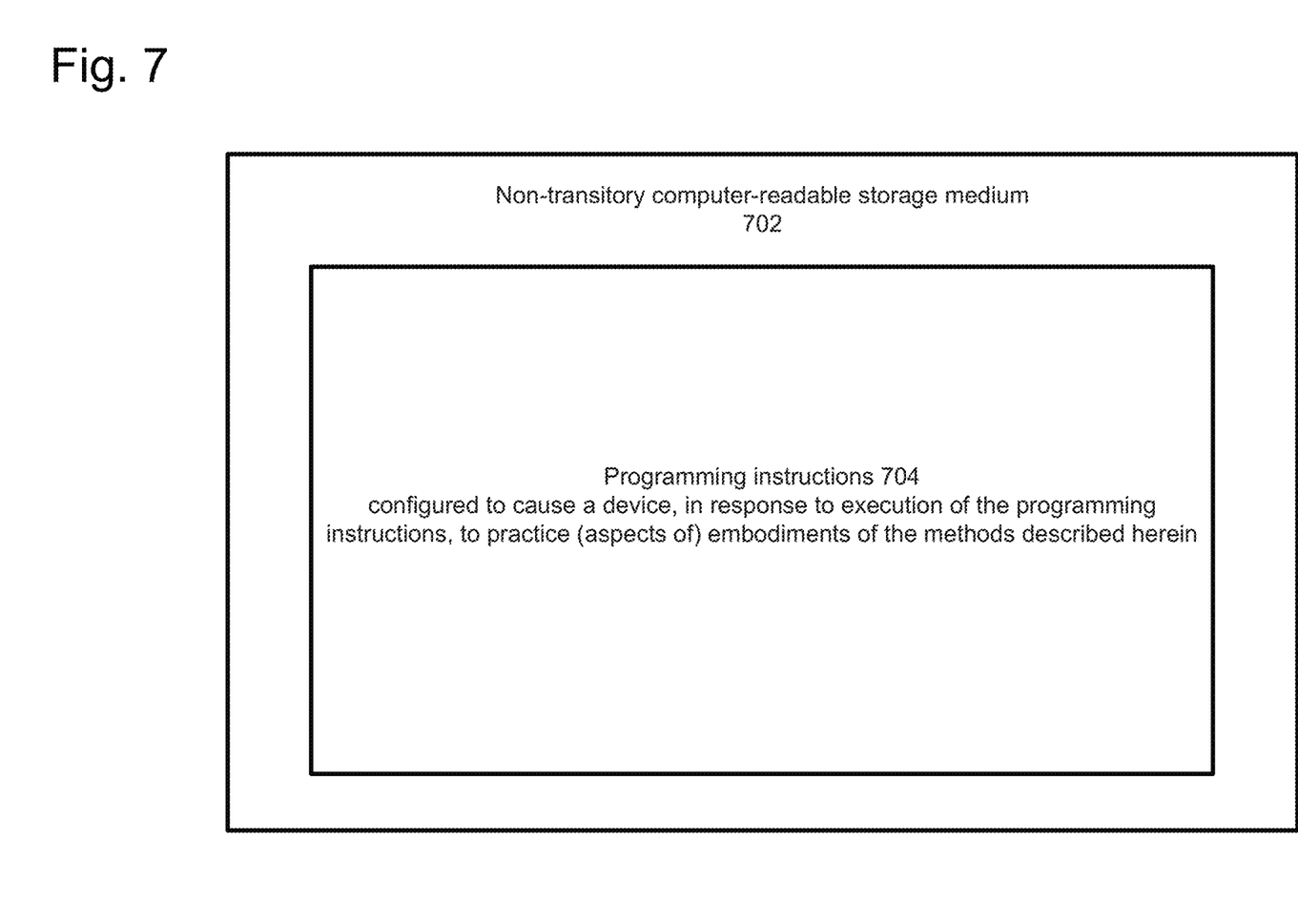
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with the techniques earlier described, in accordance with various embodiments. As illustrated, least one computer-readable storage medium 702 may include a number of programming instructions 704. Programming instructions 804 may be configured to enable a device, e.g., computer 600, in response to execution of the programming instructions, to perform, e.g., various operations of processes of FIGS. 2-5, e.g., but not limited to, to the various operations performed to perform mediation of computer-accessible resource access. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes of FIGS. 2-5. For one embodiment, at least one of processors 602 may be packaged together with computational logic 622 configured to practice aspects of processes of FIGS. 2-5 to form a System in Package (SiP). For one embodiment, at least one of processors 602 may be integrated on the same die with computational logic 622 configured to practice aspects of processes of FIGS. 2-5. For one embodiment, at least one of processors 602 may be packaged together with computational logic 622 configured to practice aspects of processes of FIGS. 2-5 to form a System on Chip (SoC). For at least one embodiment, the SoC may be utilized in, e.g., but not limited to, a computing tablet. (e.g., WiFi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 includes an apparatus to facilitate access by a computing device to computer-accessible resources. The apparatus includes: a request receiver to receive a request from a computing device for a user to access a computer-accessible resource using the computing device; a context retriever to obtain information for a current context for usage of the computing device by the user; and an access mediator. The access mediator is to determine, based on an operating profile for the user and/or the computing device, whether the computing device is permitted to access the computer-accessible resource in the current context and mediate access of the computer-accessible resource by the computing device.

Example 2 includes the apparatus of example 1, wherein the request receiver is to receive a request to use a local resource of the computing device.

Example 3 includes the apparatus of example 1, wherein the request receiver is to receive a request from the computing device to use a networked resource.

Example 4 includes the apparatus of example 1, wherein the request receiver is to receive a request made automatically by the computing device prior to attempted usage of the computer-accessible resource by the user.

Example 5 includes the apparatus of example 4, wherein the request receiver is to receive a request made due to the computing device being located within a particular area or connecting to a particular network.

Example 6 includes the apparatus of example 5, wherein the request receiver is to receive a request made due to the computing device being located within a particular range of particular location.

Example 7 includes the apparatus of any of examples 1-6, wherein the request receiver is to receive a request for available computer-accessible resources.

Example 8 includes the apparatus of any of examples 1-6, wherein the context retriever is to obtain information describing a location of the computing device.

Example 9 includes the apparatus of example 8, wherein the computing device includes a first computing device and the context retriever is to obtain information describing a proximity of the first computing device to a second computing device.

Example 10 includes the apparatus of any of examples 1-6, wherein the context retriever is to obtain information describing a current operational state of the computing device.

Example 11 includes the apparatus of example 10, wherein the context retriever is to obtain information about current network connectivity of the computing device.

Example 12 includes the apparatus of any of examples 1-6, wherein the context retriever is to obtain an identity of the user.

Example 13 includes the apparatus of any of examples 1-6, wherein the access mediator is to mediate networked connection between the computing device and the computer-accessible resource.

Example 14 includes the apparatus of any of examples 1-6, wherein the access mediator is to permit usage of a local resource of the computing device by the computing device.

Example 15 includes the apparatus of any of examples 1-6, wherein the access mediator is to provide identification of computer-accessible resources available to the user using the computing devices.

Example 16 includes a computer-implemented method for facilitating access by a computing device to computer-accessible resources. The method includes: receiving, by a request receiver of a computer-implemented context-based access mediator ("CAM"), a request from a computing device for a user to access a computer-accessible resource using the computing device; obtaining, by a context retriever of the CAM, information for a current context for usage of the computing device by the user; determining, by an access mediator of the CAM, based on an operating profile for the user and/or the computing device, whether the computing device is permitted to access the computer-accessible resource in the current context; and mediating, by the access mediator of the CAM, access of the by the computing device.

Example 17 includes the method of example 16, wherein receiving a request from a computing device includes receiving a request to use a local resource of the computing device.

Example 18 includes the method of example 16, wherein receiving a request from a computing device includes receiving a request from the computing device to use a networked resource.

Example 19 includes the method of example 16, wherein receiving a request from a computing device includes receiving a request made automatically by the computing device prior to attempted usage of the computer-accessible resource by the user.

Example 20 includes the method of example 19, wherein receiving a request made automatically by the computing device prior to attempted usage of the computer-accessible resource by the user includes receiving a request made due to the computing device being located within a particular area or connecting to a particular network.

Example 21 includes the method of example 20, wherein receiving a request made due to the computing device being located within a particular area includes receiving a request made due to the computing device being located within a particular range of particular location.

Example 22 includes the method of any of examples 16-21, wherein receiving a request from a computing device includes receiving a request for available computer-accessible resources.

Example 23 includes the method of any of examples 16-21, wherein obtaining information for a current context for usage of the computing device by the user includes obtaining information describing a location of the computing device.

Example 24 includes the method of example 23, wherein the computing device includes a first computing device and obtaining information for a location of the computing device includes obtaining information describing a proximity of the first computing device to a second computing device.

Example 25 includes the method of any of examples 16-21, wherein obtaining information for a current context for usage of the computing device by the user includes obtaining information describing a current operational state of the computing device.

Example 26 includes the method of example 25, wherein obtaining information for a current operational state of the computing device includes obtaining information about current network connectivity of the computing device.

Example 27 includes the method of any of examples 16-21, wherein obtaining information for a current context for usage of the computing device by the user includes obtaining an identity of the user.

Example 28 includes the method of any of examples 16-21, wherein mediating access of the computer-accessible resource by the computing device includes mediating networked connection between the computing device and the computer-accessible resource.

Example 29 includes the method of any of examples 16-21, wherein mediating access of the computer-accessible resource by the computing device includes permitting usage of a local resource of the computing device by the computing device.

Example 30 includes the method of any of examples 16-21, wherein mediating access of the computer-accessible resource by the computing device includes providing identification of computer-accessible resources available to the user using the computing devices.

Example 31 includes one or more computer-readable media containing instructions written thereon for facilitating access by a computing device to computer-accessible resources. The instructions are to, in response to execution by a computing system, cause the computing system to receive a request from a computing device for a user to access a computer-accessible resource using the computing device; obtain information for a current context for usage of the computing device by the user; determine, based on an operating profile for the user and/or the computing device, whether the computing device is permitted to access the computer-accessible resource in the current context; and mediate access of the by the computing device.

Example 32 includes the computer-readable media of example 31, wherein receive a request from a computing device includes receive a request to use a local resource of the computing device.

Example 33 includes the computer-readable media of example 31, wherein receive a request from a computing device includes receive a request from the computing device to use a networked resource.

Example 34 includes the computer-readable media of example 31, wherein receive a request from a computing device includes receive a request made automatically by the computing device prior to attempted usage of the computer-accessible resource by the user.

Example 35 includes the computer-readable media of example 34, wherein receive a request made automatically by the computing device prior to attempted usage of the computer-accessible resource by the user includes receive a request made due to the computing device being located within a particular area or connecting to a particular network.

Example 36 includes the computer-readable media of example 35, wherein receive a request made due to the computing device being located within a particular area includes receive a request made due to the computing device being located within a particular range of particular location.

Example 37 includes the computer-readable media of any of examples 31-36, wherein receive a request from a computing device includes receive a request for available computer-accessible resources.

Example 38 includes the computer-readable media of any of examples 31-36, wherein obtain information for a current context for usage of the computing device by the user includes obtain information describing a location of the computing device.

Example 39 includes the computer-readable media of example 38, wherein: the computing device includes a first computing device; and obtain information for a location of the computing device includes obtain information describing a proximity of the first computing device to a second computing device.

Example 40 includes the computer-readable media of any of examples 31-36, wherein obtain information for a current context for usage of the computing device by the user includes obtain information describing a current operational state of the computing device.

Example 41 includes the computer-readable media of example 40, wherein obtain information for a current operational state of the computing device includes obtain information about current network connectivity of the computing device.

Example 42 includes the computer-readable media of any of examples 31-36, wherein obtain information for a current context for usage of the computing device by the user includes obtain an identity of the user.

Example 43 includes the computer-readable media of any of examples 31-36, wherein mediate access of the computer-accessible resource by the computing device includes mediate networked connection between the computing device and the computer-accessible resource.

Example 44 includes the computer-readable media of any of examples 31-36, wherein mediate access of the computer-accessible resource by the computing device includes permit usage of a local resource of the computing device by the computing device.

Example 45 includes the computer-readable media of any of examples 31-36, wherein mediate access of the computer-accessible resource by the computing device includes provide identification of computer-accessible resources available to the user using the computing devices.

Example 46 includes an apparatus for facilitating access by a computing device to computer-accessible resources. The apparatus includes: means for receiving a request from a computing device for a user to access a computer-accessible resource using the computing device; means for obtaining information for a current context for usage of the computing device by the user; means for determining, based on an operating profile for the user and/or the computing device, whether the computing device is permitted to access the computer-accessible resource in the current context; and means for mediating access of the by the computing device.

Example 47 includes the apparatus of example 46, wherein means for receiving a request from a computing device includes means for receiving a request to use a local resource of the computing device.

Example 48 includes the apparatus of example 46, wherein means for receiving a request from a computing device includes means for receiving a request from the computing device to use a networked resource.

Example 49 includes the apparatus of example 46, wherein means for receiving a request from a computing device includes means for receiving a request made automatically by the computing device prior to attempted usage of the computer-accessible resource by the user.

Example 50 includes the apparatus of example 49, wherein means for receiving a request made automatically by the computing device prior to attempted usage of the computer-accessible resource by the user includes means for receiving a request made due to the computing device being located within a particular area or connecting to a particular network.

Example 51 includes the apparatus of example 50, wherein means for receiving a request made due to the computing device being located within a particular area includes means for receiving a request made due to the computing device being located within a particular range of particular location.

Example 52 includes the apparatus of any of examples 46-61, wherein means for receiving a request from a computing device includes means for receiving a request for available computer-accessible resources.

Example 53 includes the apparatus of any of examples 46-61, wherein means for obtaining information for a current context for usage of the computing device by the user includes means for obtaining information describing a location of the computing device.

Example 54 includes the apparatus of example 53, wherein the computing device includes a first computing device and means for obtaining information for a location of the computing device includes means for obtaining information describing a proximity of the first computing device to a second computing device.

Example 55 includes the apparatus of any of examples 46-51, wherein means for obtaining information for a current context for usage of the computing device by the user includes means for obtaining information describing a current operational state of the computing device.

Example 56 includes the apparatus of example 55, wherein means for obtaining information for a current operational state of the computing device includes means for obtaining information about current network connectivity of the computing device.

Example 57 includes the apparatus of any of examples 46-51, wherein means for obtaining information for a current context for usage of the computing device by the user includes means for obtaining an identity of the user.

Example 58 includes the apparatus of any of examples 46-51, wherein means for mediating access of the computer-accessible resource by the computing device includes means for mediating networked connection between the computing device and the computer-accessible resource.

Example 59 includes the apparatus of any of examples 46-51, wherein means for mediating access of the computer-accessible resource by the computing device includes means for permitting usage of a local resource of the computing device by the computing device.

Example 60 includes the apparatus of any of examples 46-51, wherein means for mediating access of the computer-accessible resource by the computing device includes means for providing identification of computer-accessible resources available to the user using the computing devices.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
   processor circuitry communicatively coupled with communication interface circuitry, the processor circuitry is arranged to operate a request receiver to at least receive, via the communication interface circuitry, a request from a computing device for a user to access a computer-accessible resource using the computing device;
   the processor circuitry arranged to operate a context retriever to at least obtain context information including information about a state of the computing device that includes information about one or more states of one or more local resources of the computing device, the local resource being physically located in or on the computing device or being in communication with the computing device via a short range communication link; and
   the processor circuitry arranged to operate an access mediator to at least:
     determine, based on the context information and an operating profile for the user or the computing device, whether the computing device is permitted to access the computer-accessible resource, and
     mediate access of the computer-accessible resource by the computing device, wherein, to mediate access, the access mediator is to:
       grant access to the computer-accessible resource when the user or the computing device is allowed to access the computer-accessible resource, and
       grant access to an alternative computer-accessible resource when the user or the computing device is not allowed to access the computer-accessible resource and when the user or the computing device is allowed to access the alternative computer-accessible resource.

2. The apparatus of claim 1, wherein the operating profile is to indicate one or more of user preferences and access policies.

3. The apparatus of claim 1, wherein the request is for use of a networked resource or a local resource of the one or more local resources by the computing device, and the networked resource being located on a server, a networked data storage device, or a user device remote from the computing device.

4. The apparatus of claim 1, wherein the request includes one or more of:
   a request made automatically by the computing device prior to attempted usage of the computer-accessible resource by the computing device,
   a request made in response to the computing device being located within a particular area or connecting to a particular network, a request made in response to the computing device being located within a particular range of the particular location, and a request for available computer-accessible resources.

5. The apparatus of claim 4, wherein, when the request includes a request for available computer-accessible resources, the processor circuitry is arranged to operate the access mediator to determine one or more computer-accessible resources that are available for access by the computing device.

6. The apparatus of claim 1, wherein the request includes the context information, and the context information further comprises one or more of:
information indicating one or more applications currently executing on the computing device,
information indicating resident applications on the computing device, and
information indicating current users capable of using the computing device,
information indicating logins of the current users on one or more computer-accessible resources,
information indicating a memory usage or state,
information indicating any network connections,
information indicating a physical location of the computing device as determined by the computing device, and
information indicating a physical distance between the computing device and one or more computer-accessible resources as determined by the computing device.

7. The apparatus of claim 6, wherein the context information further includes information indicating usage of the computing device.

8. The apparatus of claim 7, wherein, when the context information comprises the information comprising the indication of the usage of the computing device, the information indicating the usage of the computing device includes one or more of:
a time of usage of the computing device,
users that are logged into or otherwise operating the computing device,
network resources that have been accessed using the computing device, and
a degree of user activity on the computing device.

9. The apparatus of claim 8, wherein the processor circuitry is arranged to obtain additional context information from one or more resources external to the computing device, wherein the additional context information includes one or more of:
a location of the computer-accessible resource;
information about users that are currently accessing the computer-accessible resource;
environmental context information; and
resource context information.

10. The apparatus of claim 9, wherein, when the context information includes the environmental context information, the environmental context information includes one or more of:
information regarding locations of one or more computing devices in a facility,
a list of users that are currently capable of accessing a network resource,
a list of individuals that have used a security card to check into a facility, and
whether or not persons are physically present in a secure room.

11. The apparatus of claim 9, wherein, when the context information includes the resource context information, the resource context information includes one or more of:

a physical location of the computer-accessible resource,
one or more devices that are physically located proximate to the computer-accessible resource, and
a list of users that are currently capable of accessing the computer-accessible resource.

12. The apparatus of claim 1, wherein the processor circuitry is arranged to operate the context retriever to obtain an identity of the user.

13. The apparatus of claim 1, wherein the processor circuitry is arranged to operate the access mediator to mediate a networked connection between the computing device and the computer-accessible resource in response to the computing device or the user being permitted to access the computer-accessible resource.

14. The apparatus of claim 1, wherein the computer-accessible resource is a local resource of the one or more local resources of the computing device, and the processor circuitry is arranged to operate the access mediator to permit usage of a local resource to the computing device when the computing device or the user is permitted to access the local resource.

15. The apparatus of claim 1, wherein the processor circuitry is arranged to operate the access mediator to provide identification of computer-accessible resources available to the user using the computing device.

16. A computer-implemented method, comprising:
receiving, by a computer-implemented context-based access mediator ("CAM"), a request from a computing device for a user to access a computer-accessible resource using the computing device;
obtaining, by the CAM, context information of the computing device, the context information including information about a state of the computing device that includes information about one or more states of one or more local resources of the computing device, the local resource being physically located in or on the computing device or being in communication with the computing device via a short range communication link;
determining, by the CAM, based on the context information and an operating profile for the user or the computing device, whether the computing device is permitted to access the computer-accessible resource;
mediating, by the CAM, access of the computer-accessible resource by the computing device, the mediating comprising:
granting, by the CAM, access to the computer-accessible resource in response to determining that the user or the computing device is allowed to access the computer-accessible resource, and
granting, by the CAM, access to an another computer-accessible resource different than the computer-accessible resource in response to determining that the user or the computing device is not allowed to access the computer-accessible resource and determining that the user or the computing device is allowed to access the other computer-accessible resource.

17. The method of claim 16, wherein obtaining the context information further comprises obtaining the context information from the request, and wherein the context information further comprises:
information describing a location of the computing device,
information describing a distance between the computing device and the computer-accessible resource, and
information describing a usage of the computing device.

18. The method of claim 16, wherein the context information further comprises:

environmental context information, and
resource context information.

19. The method of claim 16, wherein granting access to the computer-accessible resource or the alternative computer-accessible resource comprises permitting usage of a networked resource or a local resource of the one or more local resources of the computing device by the computing device, and the networked resource is a resource located on a server, a networked data storage device, or a user device remote from the computing device.

20. One or more non-transitory computer-readable media (NTCRM) comprising instructions written thereon, wherein execution of the instructions by a computing system is to cause the computing system to:
  receive a request from a computing device for a user to access a computer-accessible resource using the computing device;
  obtain context information including information about a state of the computing device that includes information about one or more states of one or more local resources of the computing device, the local resource being physically located in or on the computing device or being in communication with the computing device via a short range communication link;
  determine, based on the context information and an operating profile for the user or the computing device, whether the computing device is permitted to access the computer-accessible resource;
  mediate access to the computer-accessible resource, wherein, to mediate access, execution of the instructions is to cause the computing system to:
    grant access to the computer-accessible resource in response to determination that the user or the computing device is allowed to access the computer-accessible resource, and
    grant access to an alternative computer-accessible resource in response to determination that the user or the computing device is not allowed to access the computer-accessible resource and in response to determination that the user or the computing device is allowed to access the alternative computer-accessible resource.

21. The NTCRM of claim 20, wherein the request is to be made automatically by the computing device prior to attempted usage of the computer-accessible resource by the computing device.

22. The NTCRM of claim 20, wherein the context information further comprises one or more of:
  a location of the computing device,
  a login status of the user with respect to one or more computer-accessible resources,
  a state of one or more applications executing or resident on the computing device,
  activity of the one or more local resources,
  a distance between the computing device and one or more computer-accessible resources, and
  environmental information indicating information about an environment surrounding the computing device.

23. The NTCRM of claim 20, wherein the one or more local resources include one or more sensors of the computing device.

24. The NTCRM of claim 20, wherein, to grant access to the computer-accessible resource by the computing device, execution of the instructions is to cause the computing system to permit usage of one or more networked resources by the computing device, wherein the one or more networked resource include a resource located on a server, a networked data storage device, or a user device remote from the computing device.

25. The NTCRM of claim 20, wherein, to grant access of the computer-accessible resource by the computing device, execution of the instructions is to cause the computing system to permit usage of a local resource of the one or more local resources of the computing device by the computing device.

* * * * *